United States Patent
Lewis

(10) Patent No.: US 7,684,777 B2
(45) Date of Patent: Mar. 23, 2010

(54) ADJACENT CHANNEL REJECTION DEVICE, RECEIVING APPARATUS AND METHOD OF OPERATING A RECEIVING APPARATUS

(75) Inventor: Michael Lewis, Märsta (SE)

(73) Assignee: Infineon Technologies AG, Munich (DE)

( * ) Notice: Subject to any disclaimer, the term of this patent is extended or adjusted under 35 U.S.C. 154(b) by 1668 days.

(21) Appl. No.: 10/852,353

(22) Filed: May 24, 2004

(65) Prior Publication Data

US 2004/0264602 A1    Dec. 30, 2004

(30) Foreign Application Priority Data

Jun. 24, 2003    (SE)    .................... 0301824

(51) Int. Cl.
*H04B 1/10*    (2006.01)

(52) U.S. Cl. ................ 455/302; 455/296; 455/307; 455/305

(58) Field of Classification Search ............. 455/296, 455/302, 305
See application file for complete search history.

(56) References Cited

U.S. PATENT DOCUMENTS

| | | | | |
|---|---|---|---|---|
| 5,521,548 A | * | 5/1996 | Sugawara | ............ 455/337 |
| 5,862,466 A | * | 1/1999 | Erickson | ............ 455/321 |
| 6,330,290 B1 | | 12/2001 | Glas | ............ 375/324 |
| 6,342,821 B1 | * | 1/2002 | Kim | ............ 375/308 |
| 6,631,256 B2 | * | 10/2003 | Suominen | ............ 455/302 |
| 6,785,529 B2 | * | 8/2004 | Ciccarelli et al. | ............ 455/324 |
| 6,892,060 B2 | * | 5/2005 | Zheng | ............ 455/302 |
| 6,940,916 B1 | * | 9/2005 | Warner et al. | ............ 375/261 |
| 7,443,783 B2 | * | 10/2008 | DeChamps et al. | ............ 370/208 |
| 2003/0072393 A1 | * | 4/2003 | Gu | ............ 375/322 |
| 2003/0139167 A1 | | 7/2003 | Ciccarelli et al. | ............ 455/324 |
| 2004/0066861 A1 | * | 4/2004 | Song et al. | ............ 375/316 |

OTHER PUBLICATIONS

David Sanderson et al.; "5-6 GHz SiGe VCO with Tunable Polyphase Output for Analog Image Rejection and I'Q Mismatch Compensation"; Radio Frequency Integrated Circuits Symposium; pp. 683-686, Jun. 2003.

* cited by examiner

*Primary Examiner*—Lana N Le
(74) *Attorney, Agent, or Firm*—Coats & Bennett, P.L.L.C.

(57) ABSTRACT

In a receiving apparatus comprising a quadrature mixer (5) for mixing a radio-frequency signal with a local oscillator signal to in-phase (I) and quadrature (Q) signal components at an intermediate frequency, a polyphase filter (9) for band pass filtering the IQ signal components, and an analog-to-digital converter (13) for converting the IQ signal components into digital form, and in which receiving apparatus adjacent channel interference may occur due to IQ signal component mismatching in the quadrature mixer (5), there is provided an adjacent channel rejection device connected between the quadrature mixer (5) and the polyphase filter (9). The device comprises an analog compensation circuit (33a; 33b; 33a-b) for compensating for the IQ signal component mismatching.

6 Claims, 3 Drawing Sheets

ADJACENT CHANNEL REJECTION DEVICE, RECEIVING APPARATUS AND METHOD OF OPERATING A RECEIVING APPARATUS

PRIORITY

This application claims priority to Swedish application no. 0301824-9 filed Jun. 24, 2003.

TECHNICAL FIELD OF THE INVENTION

The present invention relates to receiving apparatuses, such as e.g. radio receivers, using an IF (intermediate frequency) architecture with a polyphase filter, in which adjacent channel interference due to IQ (in-phase and quadrature) signal mismatch occurs. More specifically the invention relates to an adjacent channel rejection device, a receiving apparatus and a method of operating a receiving apparatus.

DESCRIPTION OF RELATED ART AND BACKGROUND OF THE INVENTION

Low-IF architectures have a number of advantages for low cost radio receivers, most notably the absence of an external filter component and insensitivity to DC offsets in the receiver chain.

A prior art example low-IF receiver structure is pictured in FIG. 1. A radio signal is initially received by an antenna 1, and a low noise amplifier (LNA) 3 provides initial amplification of the received signal. A quadrature mixer 5 then mixes the signal with the output of a local oscillator 7 into in-phase I and quadrature Q components with the frequency reduced so that the wanted signal is centered around the low-IF frequency. The signal is then filtered through a polyphase filter 9, which has a band pass frequency response centered around the wanted signal to allow only the wanted signal to pass trough. Following amplification by a programmable gain amplifier (PGA) stage 11, the signal is by means of an analog-to-digital converter 13 converted to digital form for demodulation.

An ideal frequency plan of the low-IF receiver structure is shown in FIG. 2a. The frequency $F_c$ of the local oscillator 7 of the receiver is tuned to the frequency of the wanted signal 21 minus the low-IF frequency. The lower adjacent channel 23 is typically at a negative frequency after having been mixed in the quadrature mixer 5 as indicated in FIG. 2a. The polyphase filter 9, whose band pass frequency response is shown by the dashed curve 25, allows the wanted channel to pass through.

However, in practice, a number of effects interfere with the desired operation. The input signals from the local oscillator 7 to the mixer should ideally be sine and cosine signals, i.e. be sinusoids with a 90° phase difference. However, in practice there will be a slight phase error between the two signals. Additionally, there may be an amplitude error between the in-phase and quadrature signals caused by differences in gain between the two paths. The net result of these imperfections is that energy from negative frequencies, i.e. frequencies below the carrier frequency, are reflected or mirrored to appear as images at an equal positive frequency, as shown at 27 in FIG. 2b.

This reflection phenomenon is a severe problem in situations where the adjacent channel image is found within the pass band of the wanted signal, since it is not attenuated by the polyphase filter and thus appears as interference. Since, for example, in a WLAN 802.11g receiver the adjacent channel signal can be up to 35 dB stronger than the wanted channel signal, this effect can be a limiting factor.

The effect of the phase and amplitude error can be well modeled as a linear transformation on the signal I, Q, as follows excluding the polyphase filter:

$$\begin{pmatrix} I' \\ Q' \end{pmatrix} = K \begin{pmatrix} \cos\phi & \sin\phi \\ 0 & 1+\Delta \end{pmatrix} \begin{pmatrix} I \\ Q \end{pmatrix} \qquad (1)$$

where I', Q' are the distorted signal, $\phi$ is the phase error, $\Delta$ is the relative amplitude error, and K is a constant.

A straightforward way to eliminate the mismatch is to perform the inverse operation on the signal, using digital multiplication and summation operations:

$$\begin{pmatrix} I \\ Q \end{pmatrix} = \frac{K}{(1+\Delta)\cos\phi} \begin{pmatrix} 1+\Delta & -\sin\phi \\ 0 & \cos\phi \end{pmatrix} \begin{pmatrix} I' \\ Q' \end{pmatrix} \qquad (2)$$

A further small gain scaling or permitted gain error gives a simplified result:

$$\begin{pmatrix} I \\ Q \end{pmatrix} = K' \begin{pmatrix} 1+\alpha & \beta \\ 0 & 1 \end{pmatrix} \begin{pmatrix} I' \\ Q' \end{pmatrix} \qquad (3)$$

where $K'=K/(1+\Delta)$, $1+\alpha=(1+\Delta)/\cos\phi$, and $\beta=-\sin\phi/\cos\phi$.

There are a number of other manners to represent the error and the resulting compensation equation. However, they all have a similar effect.

SUMMARY OF THE INVENTION

A problem with the above solution of carrying out digital operations to compensate for the mismatch includes the effect of the polyphase filter in the signal path, which imply that the inverse of the transfer function of the filter must also be calculated by the digital IQ compensation circuit. This is not feasible, since the filter has a null outside the pass band.

A more intuitive explanation is that the IQ compensation circuit takes a portion of the adjacent channel signal and calculates a negative version of the image, canceling the image generated by the receiver. If the adjacent channel has been filtered away, it is no longer possible to use it to compensate the generated image.

From the point of view of the receiver, it is only possible to compensate for errors in gain that occur after the polyphase filter, i.e. mismatch in gain between the I and Q paths of the PGA stages. However, this is of limited interest in a low-IF receiver: by this stage, the adjacent channel has been removed and cannot create any further image signal in the wanted channel. The critical issue is, therefore, the IQ mismatch that occurs before the polyphase filter.

Accordingly, it is an object of the present invention to provide an adjacent channel rejection device, a receiver apparatus, and a method of operating a receiver apparatus, which are capable of rejecting adjacent channel interference, which occurs due to IQ mismatching in the quadrature mixer, i.e. before the polyphase filter.

Still a further object of the present invention is to provide such device, apparatus, and method, which are accurate, precise, efficient, simple, and of low cost.

These objects among others can be attained, for example, by an adjacent channel rejection device for a receiving apparatus, which receiving apparatus comprises a quadrature mixer for mixing an analog radio-frequency signal on a desired channel with a local oscillator signal to in-phase and quadrature signal components at an intermediate frequency, a polyphase filter for band pass filtering the in-phase and quadrature signal components, and an analog-to-digital converter for converting the in-phase and quadrature signal components into digital form, and in which adjacent channel interference may occur due to in-phase and quadrature signal component mismatching in the quadrature mixer, comprising an input for receiving the in-phase and quadrature signal components at the intermediate frequency before being band pass filtered by the polyphase filter, an analog compensation circuit device for compensating for the in-phase and quadrature signal component mismatching in the quadrature mixer, and an output for outputting towards the polyphase filter in-phase and quadrature signal components, after having compensated for the in-phase and quadrature signal component mismatching.

The analog compensation circuit device can be provided for compensating one of the in-phase and quadrature signal components relative the other one of the in-phase and quadrature signal components. The analog compensation circuit device can be provided for implementing the compensation equation:

$$I=K'((1+\alpha)I'+\beta Q'),$$

where I is the compensated in-phase signal component, I' and Q' are the distorted in-phase and quadrature signal components due to the in-phase and quadrature signal component mismatching, and K', $\alpha$ and $\beta$ are related to the amplitude and phase errors as introduced by the in-phase and quadrature signal component mismatching. The analog compensation circuit device can be provided for compensating both the in-phase and quadrature signal components. The analog compensation circuit device can be provided for implementing essentially the compensation equation $$\begin{pmatrix} I \\ Q \end{pmatrix} = \frac{K}{(1+\Delta)\cos\phi} \begin{pmatrix} 1+\Delta & -\sin\phi \\ 0 & \cos\phi \end{pmatrix} \begin{pmatrix} I' \\ Q' \end{pmatrix},$$

where I and Q are the compensated in-phase and quadrature signal components, I' and Q' are the distorted in-phase and quadrature signal components due to the in-phase and quadrature signal component mismatching, K is a constant, and $\Delta$ and $\phi$ are the amplitude and phase errors as introduced by the in-phase and quadrature signal component mismatching. The analog compensation circuit device may comprise control inputs, via which the circuit device is controlled by digital signals. The analog compensation circuit device can be based on at least one operation amplifier with differential outputs in a summing configuration, wherein the analog compensation circuit device has two differential inputs operating as virtual ground current sinks, and the operation amplifier operates as a current-to-voltage converter.

These objects can also be achieved by a receiving apparatus comprising a quadrature mixer for mixing an analog radio-frequency signal on a desired channel with a local oscillator signal to in-phase and quadrature signal components at an intermediate frequency, a polyphase filter for band pass filtering the in-phase and quadrature signal components, and an analog-to-digital converter for converting the in-phase and quadrature signal components into digital form, and in which receiving apparatus adjacent channel interference may occur due to in-phase and quadrature signal component mismatching in the quadrature mixer, wherein the receiving apparatus comprises an adjacent channel rejection device including an input for receiving the in-phase and quadrature signal components at the intermediate frequency before being band pass filtered by the polyphase filter, an analog compensation circuit for compensating for the in-phase and quadrature signal component mismatching in the quadrature mixer, and an output for outputting towards the polyphase filter the in-phase and quadrature signal components, after having compensated for the in-phase and quadrature signal component mismatching.

The analog compensation circuit device can be provided for compensating one of the in-phase and quadrature signal components relative the other one of the in-phase and quadrature signal components. The analog compensation circuit device can be provided for implementing the compensation equation $$I=K'((1+\alpha)I'+\beta Q'),$$

where I is the compensated in-phase signal component, I' and Q' are the distorted in-phase and quadrature signal components due to the in-phase and quadrature signal component mismatching, and K', $\alpha$ and $\beta$ are related to the amplitude and phase errors as introduced by the in-phase and quadrature signal component mismatching.

These objects can furthermore be achieved by a method of operating a receiver apparatus comprising a quadrature mixer, in which adjacent channel interference may occur due to in-phase and quadrature signal component mismatching, comprising the steps of:

mixing an analog radio-frequency signal on a desired channel with a local oscillator signal to in-phase and quadrature signal components at an intermediate frequency in the quadrature mixer, compensating for the in-phase and quadrature signal component mismatching in the quadrature mixer by an analog compensation circuit, band pass filtering the in-phase and quadrature signal components by a polyphase filter after having compensated for the in-phase and quadrature signal component mismatching, and converting the in-phase and quadrature signal components into digital form.

By means of providing analog compensation circuits for compensating for the IQ mismatching in the quadrature mixer and connecting them between the quadrature mixer and the polyphase filter, the in-phase and quadrature signal component mismatching before the polyphase filter can be compensated for in a simple and effective manner.

The operations performed using analog circuits are typically those performed by a digital IQ compensation unit: scaling and summation.

Preferably, the analog compensation circuits are controlled by digital signals, whose values are established by a calibration procedure.

Still preferably, the analog compensation circuits may either compensate both the in-phase and quadrature signal components, or the circuits may be simplified so that they modify either one of the in-phase and quadrature signal components at the expense of introducing a slight overall gain change. Such gain error can, however, easily be compensated for elsewhere in the receiver structure.

Further characteristics of the invention and advantages thereof will be evident from the detailed description of preferred embodiments of the present invention given hereinafter and the accompanying FIGS. 1-4, which are only given by way of illustration, and thus are not limitative of the present invention.

DETAILED DESCRIPTION OF PREFERRED EMBODIMENTS

Figure 1:
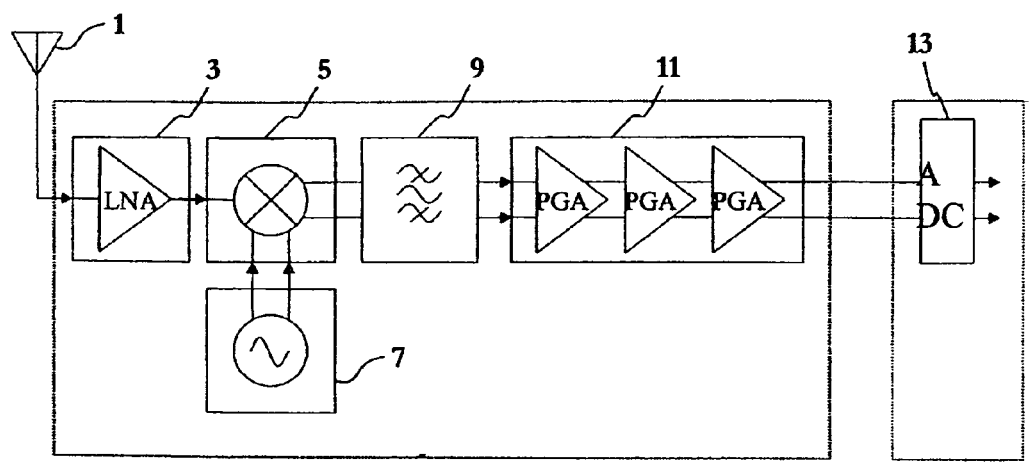
FIG. 1 illustrates a prior art example low-IF receiver structure.
Figure 2A:
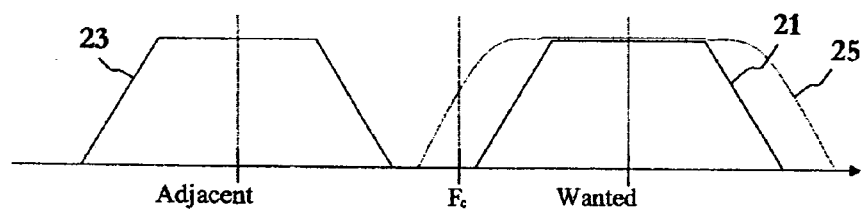
FIG. 2a shows an ideal frequency plan of the low-IF receiver structure of FIG. 1.
Figure 2B:
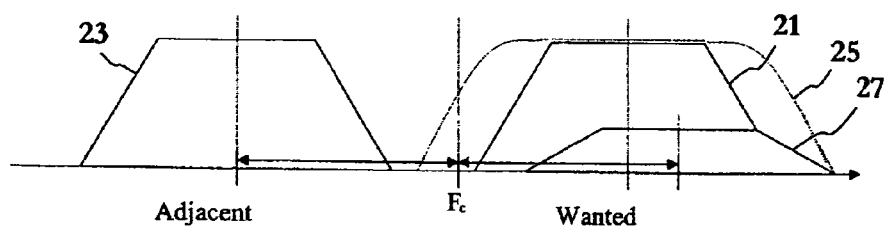
FIG. 2b shows a frequency plan of the low-IF receiver structure of FIG. 1 illustrating adjacent channel interference.
Figure 3:
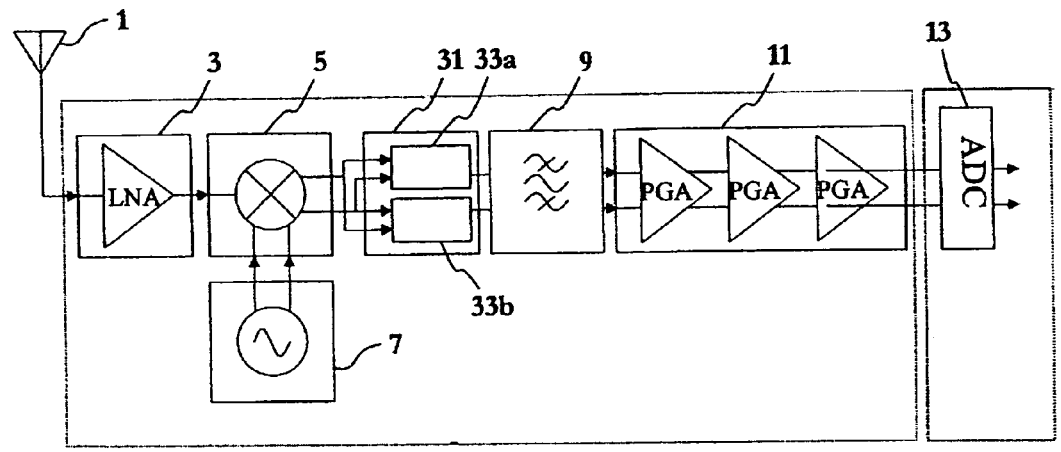
FIG. 3 illustrates a low-IF receiver structure according to a preferred embodiment of the present invention.

In FIG. 3 is illustrated a low-IF receiver structure according to a preferred embodiment of the present invention. The receiver comprises like the prior art structure of FIG. 1 an antenna 1 for receiving a radio signal, a low noise amplifier (LNA) 3 for initial amplification of the received radio signal, a local oscillator 7 for generating sine and cosine signals, a quadrature mixer 5 for mixing the amplified radio signal with the output of the local oscillator 7 into in-phase I and quadrature Q signal components at a low-IF frequency, a polyphase filter 9 having a band pass frequency response to allow only the wanted signal to pass through, a programmable gain amplifier (PGA) stage 11 for further amplification of the signal, and an analog-to-digital converter 13 for converting the signal to digital form for demodulation.

According to the present invention, an analog network 31 is placed between the outputs of the quadrature mixer 5 and the inputs of the polyphase filter 9, the purpose of which is to perform a linear combination of the in-phase I and quadrature Q signal components in order to compensate for IQ mismatch introduced up to the quadrature mixer 5. This network 31 is preferably controlled by digital signals, whose values are established by a calibration procedure, e.g. in the factory.

Such a network 31 may comprise circuits 33a, 33b for compensating both the I and Q signal components, or may comprise either circuit 33a or 33b for modifying either one the I or Q signal at the expense of introducing a slight overall gain change, which, however, can be compensated for by a change in the common gain elsewhere in the circuit.

A further amplification stage (not illustrated) may be provided before or after the inventive analog network 31.

Figure 4A:
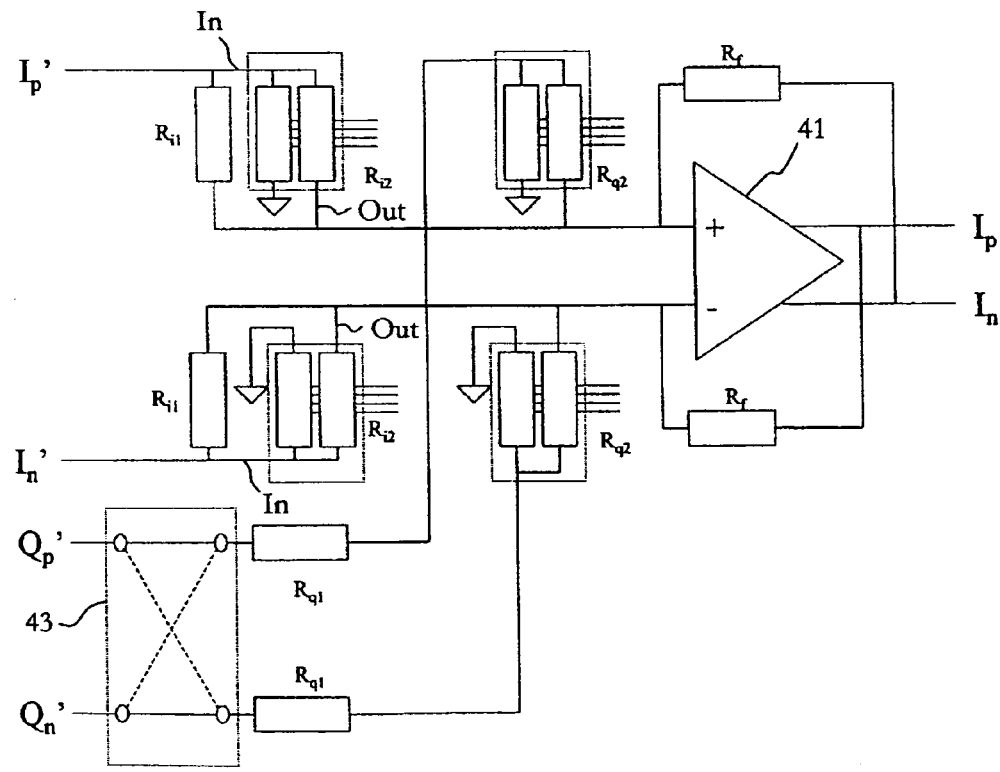
FIGS. 4a-b illustrate an adjacent channel rejection device according to a preferred embodiment of the invention.
Figure 4B:
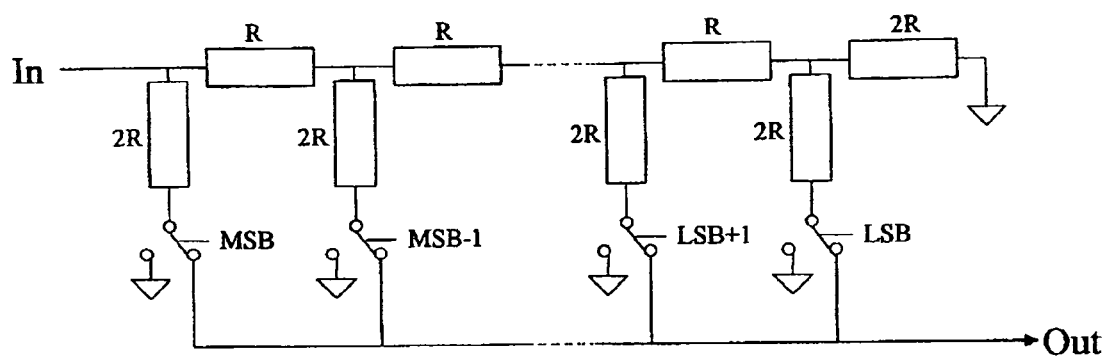

An exemplary embodiment of such kind of circuit 33a for compensating the I signal is shown in FIGS. 4a-b, which implements the compensation equation of Eq. (3). This is based around an operational amplifier 41, with differential outputs, in a standard summing configuration. The two differential inputs act as virtual ground current sinks, and the operation amplifier 41 itself acts as a current-to-voltage converter.

In FIG. 4a, $I_p'$ and $I_n'$ denote the distorted differential in-phase signal component, $Q_p'$ and $Q_n'$ denote the distorted differential quadrature signal component, $I_p$ and $I_n$ denote the differential in-phase signal component as compensated for the phase and amplitude errors relative the quadrature signal component, and 43 denote a cross-over switch at the quadrature signal input.

In Eq. (3), the desired output is given by:

$$I = K'((1+\alpha)I' + \beta Q') \quad (4)$$

where $-\alpha_1 < \alpha < \alpha_2$, $\alpha_1, \alpha_2 \ll 1$, and $-\beta_1 < \beta < \beta_2$, $\beta_1, \beta_2 \ll 1$.

On the I' input, each input current to the summing junction is made up of two components: a resistor $R_{i1}$, which is fixed, and an R-2R ladder, in FIG. 4a denoted by $R_{i2}$.

An R-2R ladder, an exemplary embodiment of which is shown in FIG. 4b, is a standard means of steering an amount of current proportional to a digital control signal into a current sink, while maintaining a constant input resistance. The R-2R ladder may comprise an arbitrary number of stages as being indicated in FIG. 4b by the dashed lines. Only the two most significant bits MSB and MSB− and the two least significant bits LSB, LSB+1 of the digital control signal are illustrated. Switches are preferably implemented using transistors in an appropriate configuration.

With m stages in the R-2R ladder, the partial output of the operation amplifier 41 due to this current source is given by:

$$I = \left(\frac{R_f}{R_{i1}} + \frac{AR_f}{2^m R_{i2}}\right)I' \quad (5)$$

where $R_f$ is a feedback resistance and A is an integer control input A such that $0 \leq A < 2^m$. If no gain error is to result, the component values should be set up such that:

$$\frac{R_f}{R_{i1}} = K'(1 - \alpha_1) \quad (6)$$

and $$\frac{R_f}{R_{i1}} + \frac{(2^m - 1)R_f}{2^m R_{i2}} = K'(1 + \alpha_2) \quad (7)$$

For the Q input, the desired response is a small positive or negative gain. The change in sign can be accomplished through the cross-over switch 43 that under digital control can reverse the positive and negative differential inputs. The signals then each passes through an initial resistance $R_{q1}$, which scales the signal to the desired range, before passing through another R-2R ladder, in FIG. 4a denoted by $R_{q2}$, which routes a digitally controlled portion of the input current to the summing junction. This gives a partial response from the Q' input according to:

$$I = \left(\frac{BR_f}{2^n(R_{q1} + R_{q2})}\right)Q' \quad (8)$$

where the n-bit integer control input B is such that $0 \leq B < 2^n$. Again, the component values should be selected such that:

$$\frac{(2^n - 1)R_f}{2^n(R_{q1} + R_{q2})} = K'\max(\beta_1, \beta_2) \quad (9)$$

The overall output of the operation amplifier 41 is therefore given by:

$$I = \left(\frac{R_f}{R_{i1}} + \frac{AR_f}{2^m R_{i2}}\right)I' + \left(\frac{BR_f}{2^n(R_{q1}+R_{q2})}\right)Q' \quad (10)$$

The use of analog circuit-based compensation prior to the polyphase filter has the advantage that it is possible to greatly improve the adjacent channel image rejection. The practical limit depends on the number of bits, and hence resistors/switches, provided in the various control elements, as well as the matching between the different components and non-ideal response of the amplifier.

The exemplary embodiment circuit given in FIGS. 4a-b is primarily for illustration purposes only. In a practical system, the choice of circuit used will depend on the process technology involved, bandwidth of various signals and the overall design style. The inventive aspect is the use of digitally controlled analog compensation prior to the filter.

This technique need not be solely restricted to low-IF receiver systems. In any heterodyne system, there is some frequency whose image lies in the wanted IF band, and this technique may be used to improve image rejection where the inherent rejection of the input stages are insufficient.

The invention claimed is:

1. An adjacent channel rejection device for a receiving apparatus, which receiving apparatus comprises a quadrature mixer for mixing an analog radio-frequency signal on a desired channel with a local oscillator signal to in-phase and quadrature signal components at an intermediate frequency, a polyphase filter for band pass filtering said in-phase and quadrature signal components, and an analog-to-digital converter for converting said in-phase and quadrature signal components into digital form, and in which adjacent channel interference may occur due to in-phase and quadrature signal component mismatching in said quadrature mixer, comprising:
    an input for receiving said in-phase and quadrature signal components at said intermediate frequency before being band pass filtered by said polyphase filter,
    an analog compensation circuit device for compensating for said in-phase and quadrature signal component mismatching in said quadrature mixer responsive to one or more predetermined digital control signals input to said analog compensation circuit device by compensating one of said in-phase and quadrature signal components relative to the other one of said in-phase and quadrature signal components, and
    an output for outputting towards said polyphase filter in-phase and quadrature signal components, after having compensated for said in-phase and quadrature signal component mismatching,
    wherein said analog compensation circuit device is provided for implementing the compensation equation I=K'((1+α)I'+βQ'), where I is the compensated in-phase signal component, I' and Q' are the distorted in-phase and quadrature signal components due to said in-phase and quadrature signal component mismatching, and K', α and β are related to the amplitude and phase errors as introduced by said in-phase and quadrature signal component mismatching.

2. The device of claim 1, wherein said analog compensation circuit device is provided for compensating both said in-phase and quadrature signal components.

3. The device of claim 2, wherein said analog compensation circuit device is provided for implementing essentially the compensation equation $$\begin{pmatrix} I \\ Q \end{pmatrix} = \frac{K}{(1+\Delta)\cos\phi}\begin{pmatrix} 1+\Delta & -\sin\phi \\ 0 & \cos\phi \end{pmatrix}\begin{pmatrix} I' \\ Q' \end{pmatrix},$$

where I and Q are the compensated in-phase and quadrature signal components, I' and Q' are the distorted in-phase and quadrature signal components due to said in-phase and quadrature signal component mismatching, K is a constant, and Δ and φ are the amplitude and phase errors as introduced by said in-phase and quadrature signal component mismatching.

4. The device of claim 1, wherein said analog compensation circuit device is based on at least one operation amplifier with differential outputs in a summing configuration, wherein said analog compensation circuit device has two differential inputs operating as virtual ground current sinks, and said operation amplifier operates as a current-to-voltage converter.

5. A receiving apparatus comprising:
    a quadrature mixer for mixing an analog radio-frequency signal on a desired channel with a local oscillator signal to in-phase and quadrature signal components at an intermediate frequency,
    a polyphase filter for band pass filtering said in-phase and quadrature signal components, and
    an analog-to-digital converter for converting said in-phase and quadrature signal components into digital form, and in which receiving apparatus adjacent channel interference may occur due to in-phase and quadrature signal component mismatching in said quadrature mixer, wherein said receiving apparatus comprises an adjacent channel rejection device including:
        an input for receiving said in-phase and quadrature signal components at said intermediate frequency before being band pass filtered by said polyphase filter,
        an analog compensation circuit for compensating for said in-phase and quadrature signal component mismatching in said quadrature mixer responsive to one or more predetermined digital control signals input to said analog compensation circuit, and
        an output for outputting towards said polyphase filter said in-phase and quadrature signal components, after having compensated for said in-phase and quadrature signal component mismatching,
    wherein said analog compensation circuit device is provided for compensating one of said in-phase and quadrature signal components relative to the other one of said in-phase and quadrature signal components and for implementing the compensation equation I=K'((1+α)I'+βQ'), where I is the compensated in-phase signal component, I' and Q' are the distorted in-phase and quadrature signal components due to said in-phase and quadrature signal component mismatching, and K', α and β are related to the amplitude and phase errors as introduced by said in-phase and quadrature signal component mismatching.

6. A method of operating a receiver apparatus comprising a quadrature mixer, in which adjacent channel interference may occur due to in-phase and quadrature signal component mismatching, comprising the steps of:

mixing an analog radio-frequency signal on a desired channel with a local oscillator signal to in-phase and quadrature signal components at an intermediate frequency in said quadrature mixer, compensating for said in-phase and quadrature signal component mismatching in said quadrature mixer responsive to one or more predetermined digital signals input to an analog compensation circuit by compensating one of said in-phase and quadrature signal components relative to the other one of said in-phase and quadrature signal components and by implementing the compensation equation $I=K'((1+\alpha)I'+\beta Q')$, where I is the compensated in-phase signal component, I' and Q' are the distorted in-phase and quadrature signal components due to said in-phase and quadrature signal component mismatching, and K', $\alpha$ and $\beta$ are related to the amplitude and phase errors as introduced by said in-phase and quadrature signal component mismatching, band pass filtering said in-phase and quadrature signal components by a polyphase filter after having compensated for said in-phase and quadrature signal component mismatching, and converting said in-phase and quadrature signal components into digital form.

\* \* \* \* \*